(12) United States Patent
Kumar et al.

(10) Patent No.: US 6,532,405 B1
(45) Date of Patent: Mar. 11, 2003

(54) METHOD FOR DETECTING A LOCKED AXLE ON A LOCOMOTIVE AC TRACTION MOTOR

(75) Inventors: Ajith Kuttannair Kumar, Erie, PA (US); Jeffrey Louis Daigle, North East, PA (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 09/634,192

(22) Filed: Aug. 9, 2000

(51) Int. Cl.[7] .............................. G05D 1/00; G05D 3/00; B60L 11/00; B61L 3/00
(52) U.S. Cl. .............................. 701/19; 701/20; 701/22; 701/81; 104/288; 105/61; 361/31; 361/57; 361/87; 361/94; 318/71; 318/782; 318/798; 318/825; 318/826; 318/490; 324/522; 324/177
(58) Field of Search .............................. 361/31, 57, 87, 361/93.1, 94; 701/19, 22, 20, 81; 318/71, 782, 798, 825, 826, 268, 455, 474, 476, 490, 459; 288/909, 903, 904; 104/288; 324/522, 772, 177; 105/61

(56) References Cited

U.S. PATENT DOCUMENTS

| | | | |
|---|---|---|---|
| 3,584,276 A | 6/1971 | Ringland et al. | 318/721 |
| 4,044,285 A | 8/1977 | Plunkett et al. | 318/803 |
| 4,320,332 A | 3/1982 | Sugimoto | 318/798 |
| 4,340,847 A | 7/1982 | Izumi | 318/490 |
| 4,695,941 A * | 9/1987 | Kumar | 700/45 |
| 5,032,771 A | 7/1991 | Kerkman et al. | 318/52 |
| 5,290,095 A * | 3/1994 | Wood et al. | 303/92 |
| 5,357,181 A | 10/1994 | Mutoh et al. | 318/139 |
| 5,376,868 A * | 12/1994 | Toyoda et al. | 318/587 |
| 5,440,219 A | 8/1995 | Wilkerson | 318/459 |
| 5,469,351 A | 11/1995 | Masrur et al. | 363/37 |
| 5,512,883 A * | 4/1996 | Lane, Jr. | 340/648 |
| 5,629,567 A * | 5/1997 | Kumar | 290/3 |
| 5,646,510 A * | 7/1997 | Kumar | 322/16 |
| 5,682,634 A | 11/1997 | Cheong et al. | 68/12.04 |
| 5,742,522 A * | 4/1998 | Yazici et al. | 702/185 |
| 5,827,148 A | 10/1998 | Seto et al. | 477/15 |
| 5,973,474 A | 10/1999 | Yamamoto | 318/801 |
| 5,990,648 A * | 11/1999 | Kumar et al. | 318/490 |
| 5,998,880 A | 12/1999 | Kumar | 290/40 B |
| 6,014,598 A | 1/2000 | Duyar et al. | 701/29 |
| 6,243,628 B1 | 6/2001 | Bliley et al. | 701/19 |
| 6,271,637 B1 * | 8/2001 | Kushion | 318/434 |

* cited by examiner

Primary Examiner—Jacques H. Louis-Jacques
Assistant Examiner—Brian J. Broadhead
(74) Attorney, Agent, or Firm—Troy J. LaMontagne; Carl A. Rowold (57) ABSTRACT

An exemplary embodiment of the invention is a method for detecting a potentially locked axle on a vehicle propelled by an AC motor. The method includes conducting a speed test by estimating axle speed and comparing estimated axle speed to measured vehicle speed. The existence of a potential locked axle condition is determined based on the comparing of estimated axle speed to measured vehicle speed. Additional tests are disclosed for determining a potential locked axle condition and a sensor fault condition.

37 Claims, 4 Drawing Sheets

METHOD FOR DETECTING A LOCKED AXLE ON A LOCOMOTIVE AC TRACTION MOTOR

BACKGROUND OF THE INVENTION

The invention relates to detection of a locked axle condition on a locomotive propelled by AC traction motors. Specifically, the invention is a method for determining the existence of such a locked axle without employing a remote axle speed sensor. Locomotives used for hauling applications are generally equipped with speed sensors coupled to respective traction motors or to the axles driven by the motors. The speed sensor data or information may be used to detect a locked axle condition. If a locked axle condition occurs on a given axle while the locomotive is moving, the rotational speed of that axle decreases to zero, and all other axles rotate at the speed corresponding to the speed of the locomotive. Thus, a locked axle condition can be detected whenever a substantial difference in speed is sensed in one axle relative to the other axles.

In addition, when a speed sensor fails to supply reliable sensor data, a locked axle condition may be indicated in a system controller since existing controllers are not generally capable of detecting a failure in the speed sensor. When a locked axle condition is indicated, the operator generally must stop the train and visually inspect the axle or wheels for any discernable damage. If the visual inspection does not reveal any useful information, then the train may have to be rolled slightly to ascertain whether in fact the axle is locked or whether the condition was indicated due to a faulty speed sensor. If the latter is true, then the locomotive can be operated at lower speeds until the speed sensor and/or speed detection system is repaired. Stopping trains, inspecting axles and operating at lower speeds involve burdensome delays. Thus, there is a need for a low-cost method to reliably determine when a locked axle condition has actually occurred that does not employ axle speed sensors.

SUMMARY OF THE INVENTION

An exemplary embodiment of the invention is a method for detecting a potentially locked axle on a vehicle propelled by an AC motor. The method includes conducting a speed test by estimating axle speed and comparing estimated axle speed to measured vehicle speed. The existence of a potential locked axle condition is determined based on the comparing of estimated axle speed to measured vehicle speed. Additional tests are disclosed for determining a potential locked axle condition and a sensor fault condition.

BRIEF DESCRIPTION OF THE DRAWINGS

Referring now to the drawings wherein like elements are numbered alike in the several FIGURES.

DETAILED DESCRIPTION OF THE INVENTION

The present invention may be utilized in various types of alternating current (AC) induction motor powered vehicles such as, for example, transit cars and locomotives. A preferred embodiment of the invention, by way of illustration is described herein as it may be applied to a locomotive. While a preferred embodiment is shown and described, it will be appreciated by those skilled in the art that the invention is not limited to the detection of axle rotation but also to AC motors and devices powered by such.

Figure 1:
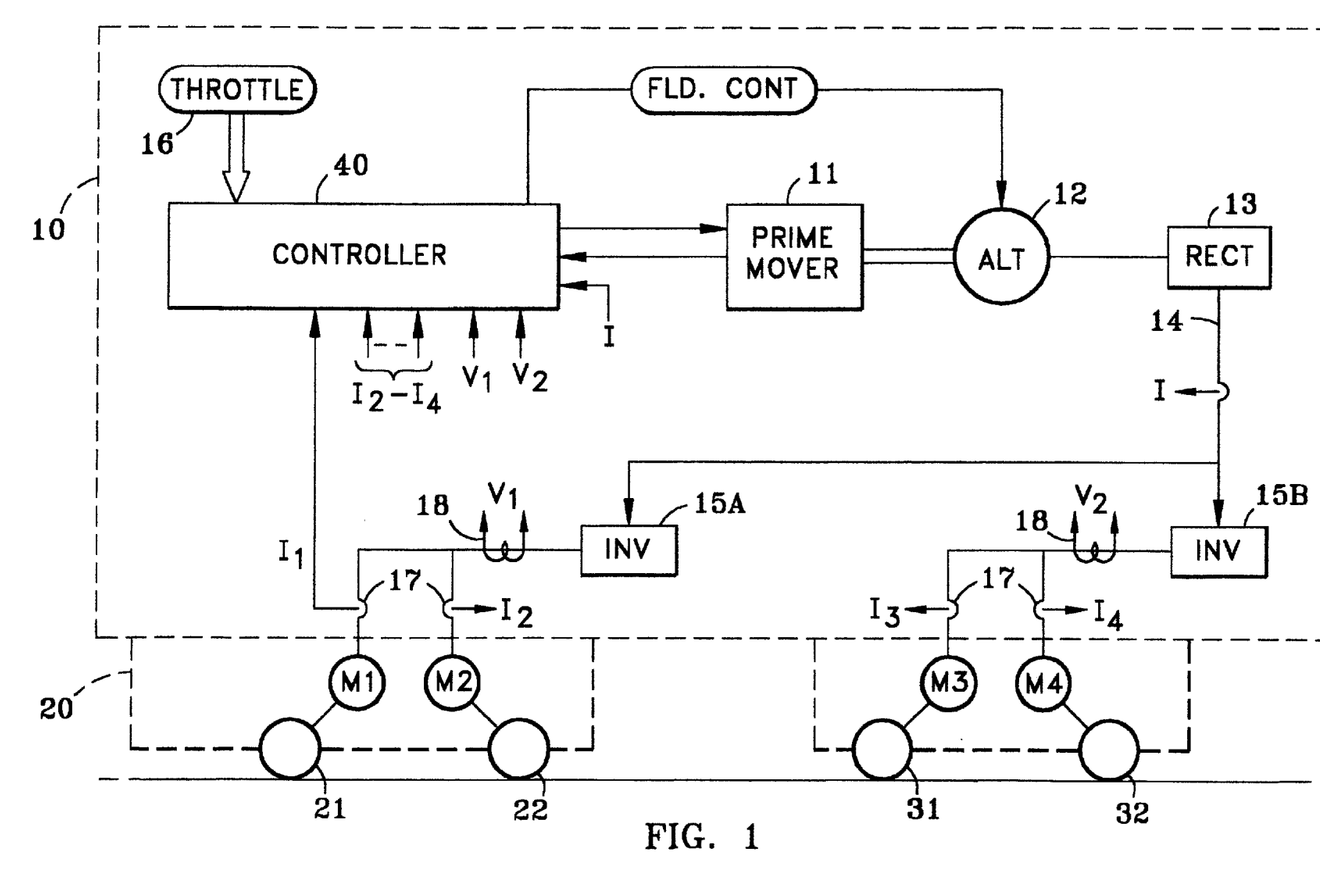
FIG. 1 depicts a simplified block diagram of a propulsion system and controller using a processor, such as may be used for executing the present invention.

A locomotive propulsion system 10 of FIG. 1 includes a variable speed prime mover 11 mechanically coupled to a rotor of a dynamo electric machine 12 comprising a 3-phase AC synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15A and 15B which invert the DC power to AC power as a selectable variable frequency. The AC power is electrically coupled in energizing relationship to each of a plurality of adjustable speed AC traction motors M1 through M4. Prime mover 11, alternator 12, rectifier bridge 13 and inverters 15A and 15B respectively are mounted on a platform of the traction vehicle 10, such as a four-axle diesel-electric locomotive. The platform is in turn supported on two trucks 20 and 30, the first truck 20 having two axle-wheel sets 21 and 22 and the second truck 30 having two-axle-wheel sets 31 and 32.

Each of the traction motors M1–M4 is hung on a separate axle with its rotor mechanically coupled via conventional gearing in driving relationship to the associated axle-wheel set. In the illustrative embodiment the two motors M1 and M2 are electrically coupled in parallel with one another and receive power from inverter 15A while motors M3 and M4 are coupled to inverter 15B. However, in some applications, it may be desirable to provide an inverter for each motor or to couple additional motors to a single inverter. Suitable current transducers 17 and voltage transducers 18 are used to sense current and voltage signals representative of the magnitudes of the current and voltage applied to the motor stators respectively. For simplicity, only single lines have been indicated for power flow although it will be apparent that the motors M1–M4 are typically three phase motors so that each power line represents three lines in such applications.

The magnitude of output voltage and current supplied to the rectifier bridge 13 is determined by the magnitude of excitation current supplied to the field windings of the alternator 12. The excitation current is set in response to an operator demand (throttle 16) for vehicle speed by the controller 40. The controller 40 converts the speed command to a corresponding torque command for use in controlling the motors M1–M4. Since AC motor torque is proportional to rotor current and air gap flux, these quantities may be monitored; or, alternatively, other quantities such as voltage, current and motor RPM may be used to reconstruct motor torque in controller 40. A more detailed analysis of such techniques is given in U.S. Pat. Nos. 4,243,927 and 5,990,648.

Controller 40 may consist of, but not be limited to, a processor, memory, signal interfaces as necessary, arranged in a configuration to perform the computations required to execute the above mentioned locomotive speed control as well as additional functions. As is exemplified by the current invention, one such function may be providing the processing for detecting the existence of a locked-axle condition. Controller 40 receives various input signals to facilitate such processing and may also provide output signals in response. Controller 40 may receive among others, the following: a signal representative of locomotive speed, such as may be readily obtained from one or more radar sensors or other vehicle speed sensors, signals representative of measured motor torque, voltage, current, and flux as may be readily measured or calculated. Controller 40 supplies as output signals: a signal representative of a desired motor speed which may be supplied to the inverter driving the motor coupled to the axle and information in connection with the status of the axle. Such information may be displayed by a suitable display (not shown) to inform an operator of the presence of a locked axle condition so that appropriate corrective measures can be promptly implemented. In addition, such information may also be transmitted to a fault storage unit for maintaining fault history on a given locomotive.

Figure 5A:
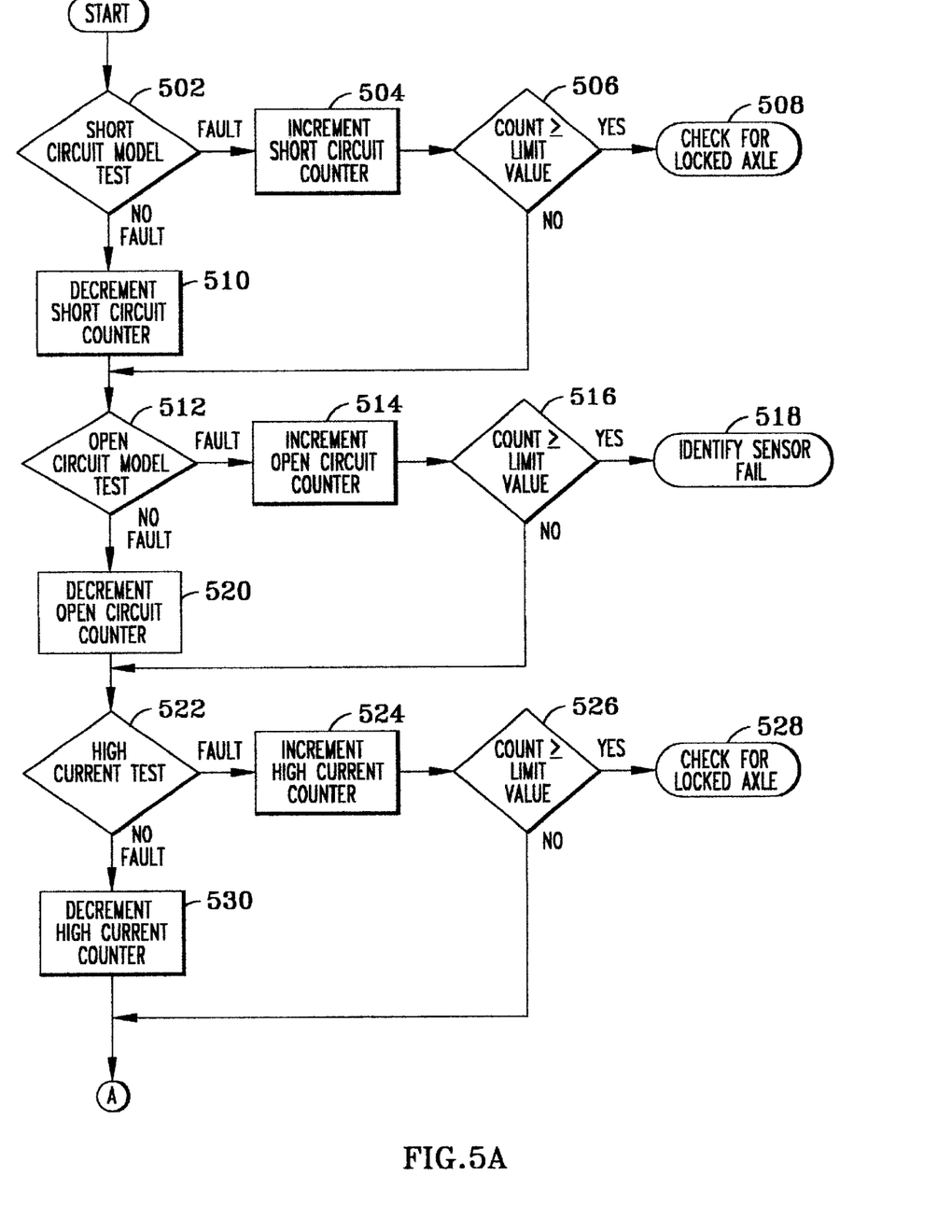
FIGS. 5A–5B collectively, depict a flow chart of one exemplary embodiment of the detection method of the present invention.
Figure 5B:
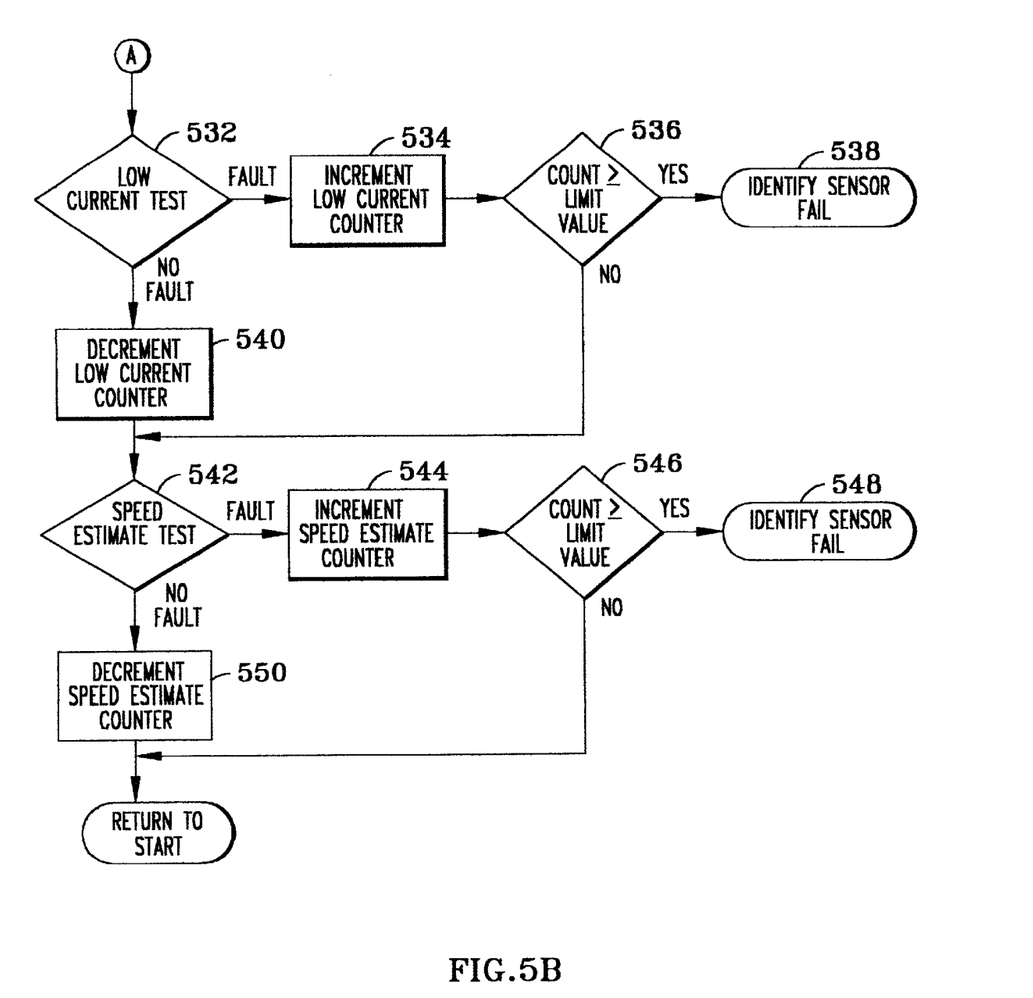

FIGS. 5A–5B which are interconnected through connecting circle labeled A depict a flow chart useful for describing a preferred embodiment in accordance with the method of the present invention. The controller 40 in addition to executing the functions necessary to perform field oriented speed control of the motors M1–M4, also executes a series of tests as identified herein whenever the locomotive is traveling at speed in excess of a minimal limit. The tests determine the status of the operating condition of the motors M1–M4. The resulting status is then utilized to formulate a determination as to the condition of the motor and subsequently the axle. The results from each of the tests are logged in fault status monitors. The fault status monitors are then compared to selected limits for determination of a fault. By way of illustration, the invention is described as utilizing fault counter to perform the function of fault status monitoring. However, one skilled in the art will appreciate that there are numerous variations and methods to perform the disclosed functions.

The first set of the tests are based upon the per phase short circuit and open circuit models of an AC induction motor. Maximum and minimum motor current thresholds are established. The second set of tests result from selected acceptable ranges for torque and flux, thereby yielding motor functional current limits, which are then compared to sensed motor operating current. Finally, locomotive speed dictates the threshold for the locomotive controller's estimates of axle speed. A preferred embodiment of the invention, by way of illustration is described herein employing tests with specified thresholds. While a preferred embodiment is shown and described employing five tests with particular specified thresholds, it will be appreciated by those skilled in the art that the invention is not limited to the enumerated tests or exact thresholds but also may include several variations on each. From the tests identified and taken together, a determination may be made whether the AC motor appears locked and consequently the axle is potentially locked.

Figure 2:
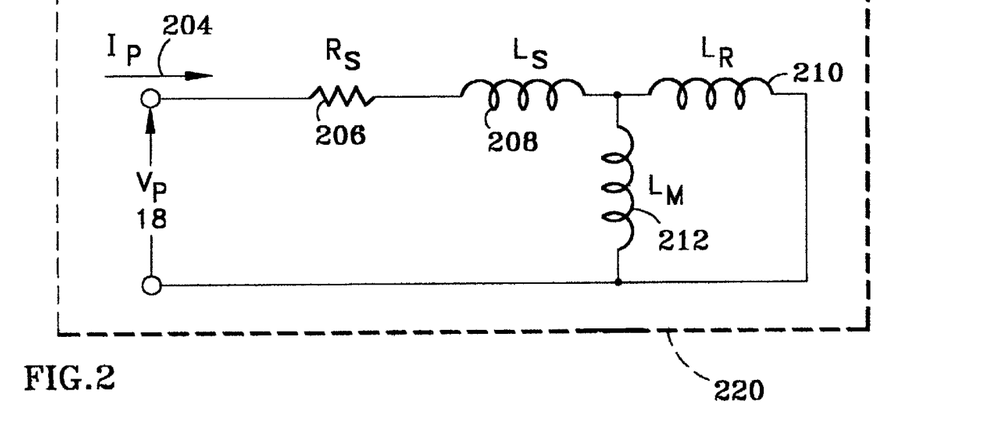
FIG. 2 depicts the per phase equivalent short circuit model of an AC induction motor.

The first test is based upon the per phase short circuit model of an AC induction motor. From this test the maximum motor current threshold is established. FIG. 2 depicts the per phase equivalent short circuit model 200 of an AC induction motor. Those skilled in the art would recognize that the model circuit 200 represents the per phase impedance to the applied phase-to-neutral voltage from voltage transducer 18 presented by an AC induction motor under a condition of high slip. The model circuit 200 includes the series combination of the motor stator resistance 206, the stator inductance 208, and the parallel combination of the rotor inductance 210 and mutual inductance 212. As is well known to those skilled in the art, from such an equivalent circuit, using well-known principles the theoretical per phase current 204 can be calculated using information such as the applied phase-to-neutral voltage and the impedances of the various elements 206–212. Again, as is well known to those skilled in the art, for the purposes of computational simplification, the stator resistance 206 can be ignored, as its contribution to the overall circuit impedance is small. Further, the inductance $L_M$ may also be neglected in the model as its impedance is much larger that that of $L_R$ thereby, simplifying the calculation of the overall modeled impedance. This calculated per phase current 204 corresponds to the maximum possible current that the motor could draw when excited with the applied phase-to-neutral voltage. Thus, the calculated per phase current 204 defines the calculated maximum threshold for the measured motor current from current transducer 17. Using the model from FIG. 2, the short circuit current threshold as a function of the applied motor voltage is calculated and compared to the measured motor current as follows, thereby establishing the first test:

$$I_{MEASURED} \geq \frac{(Applied\ Voltage)(Constant)}{(Excitation\ Frequency)(L_S + L_R)}$$

where the Constant is a scaling factor utilized to adjust the maximum current threshold relative to the maximum current determined from the model parameters. When the expression above is true, that is measured motor current is equal to or in excess of the maximum current threshold; the result is logged in a first fault counter, incrementing the counter. When the expression above is false, that is measured motor current is less than the maximum current threshold; the first fault counter is decremented. Should the counter exceed a predetermined limit value, the fault is logged as a potentially locked axle and a maintenance check for a locked axle may be initiated.

Figure 3:
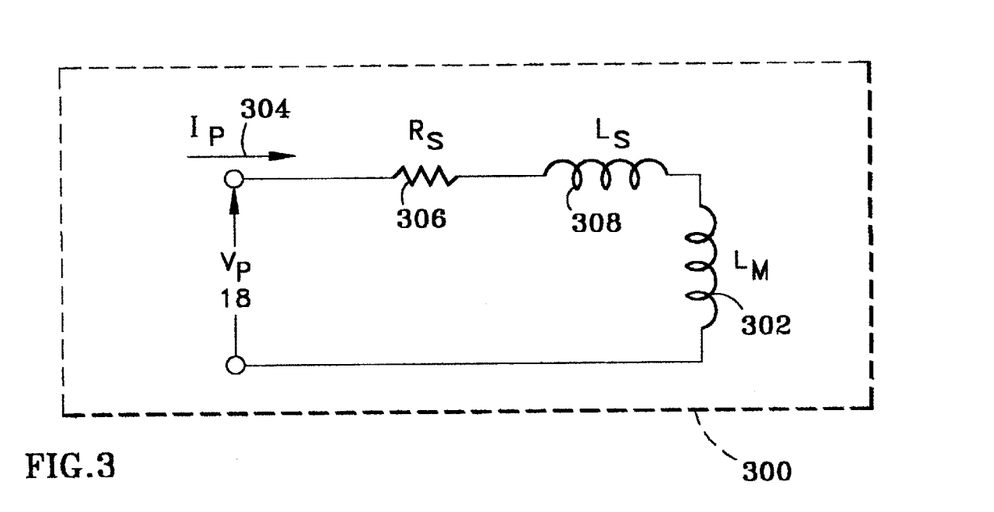
FIG. 3 depicts the per phase equivalent open circuit model of an AC induction motor.

The second test is based upon the per phase open circuit model of an AC induction motor. From this test the minimum motor current threshold is established. FIG. 3 depicts the per phase equivalent open circuit model 300 of an AC induction motor. Those skilled in the art would recognize that the model circuit 300 represents the per phase impedance to the applied phase-to-neutral voltage from voltage transducer 18 presented by an AC induction motor under the condition of a minimal applied voltage to just flux the motor. The model circuit 300 includes the series combination of the motor stator resistance 306, the stator inductance 308, and the mutual inductance 310. As is well known to those skilled in the art, from such an equivalent circuit, using well-known principles the theoretical per phase current 304 can be calculated using information such as the applied phase-to-neutral voltage and the impedances of the various elements 306–310. Again, as is well known to those skilled in the art, for the purposes of computational simplification, the stator resistance 306 can be ignored, as its contribution to the overall circuit impedance is small. This calculated per phase current 304 corresponds to the minimum possible current that the motor could draw when excited with the applied phase-to-neutral voltage. Thus, the calculated per phase current 304 defines the calculated minimum threshold for the measured motor current from current transducer 17. Using the model from FIG. 3, the open circuit current threshold as a function of the applied motor voltage is calculated and compared to the measured motor current as follows, thereby establishing the second test:

$$I_{MEASURED} \leq \frac{(Applied\ Voltage)(Constant)}{(Excitation\ Frequency)(L_S + L_M)}$$

where the Constant is a scaling factor utilized to adjust the minimum current threshold relative to the minimum current determined from the model parameters. When the expression above is true, that is, measured motor current is equal to or less than the minimum current threshold; the result is logged in a second fault counter, incrementing the counter. When the expression above is false, that is measured motor current is in excess of the minimum current threshold; the fault counter is decremented. Should the counter exceed a predetermined limit value, the fault is logged as a failure of the speed sensor-less traction motor control.

Figure 4:
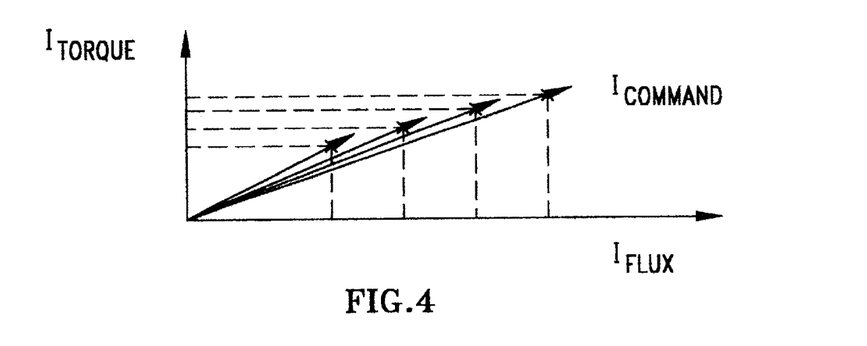
FIG. 4 depicts the relationship of induction motor commanded current as the vector sum of its torque-producing and flux-producing components.

The third and fourth tests are based upon establishing expected high and low operating motor current thresholds determined from selected operating torque and flux relationships of an AC induction motor. The thresholds are established from selected ratios of expected high and low command current limits. The tests then compare measured motor current to the established thresholds. FIG. 4 depicts the feed forward command current $I_{COMMAND}$ as a vector combination the torque-producing $I_{TORQUE}$ and flux-producing $I_{FLUX}$ current components. Those skilled in the art will appreciate that the command current generated by controller 40 can be determined using well-known principles and information about the motor and its operating conditions such as flux and torque. Further, one skilled in the art will appreciate that for a specific operating condition, the measured motor current should be within some selected ratio of the command current.

This calculated command current and ratio correspond to the expected high limit and expected low limit currents that the motor may draw under the particular operating conditions. Thus, the calculated command current and ratio defines the high and low thresholds for the measured motor current 17. Using the relationships from FIG. 3, the high current threshold as a function of the commanded current is calculated and compared to the measured motor current from current transducer 17 as follows, thereby establishing the third test:

$$I_{MEASURED} \geq (3/2) I_{COMMANDED}.$$

The factor 3/2 is exemplary and it is understood that other factors may be used. When the expression above is true, that is measured motor current is equal to or in excess of the high current threshold; the result is logged in a third fault counter, incrementing the counter. When the expression above is false, that is measured motor current is less than the high current threshold; the third fault counter is decremented. Should the counter exceed a predetermined limit value, the fault is logged as a potentially locked axle and a maintenance check for a locked axle can be initiated.

In addition, using the relationships from FIG. 3, the low current threshold as a function of the commanded current is calculated and compared to the measured motor current from current transducer 17 as follows, thereby establishing the fourth test:

$$I_{MEASURED} \geq (3/4)\ I_{COMMANDED}.$$

The factor 3/4 is exemplary and it is understood that other factors may be used. When the expression above is true, that is, measured motor current is equal to or less than the low current threshold; the result is logged in a fourth fault counter, incrementing the counter. When the expression above is false, that is measured motor current in excess of the low current threshold; the fourth fault counter is decremented. Should the counter exceed a predetermined limit value, the fault is logged as a failure of the speed sensor-less traction motor control.

The fifth test is based upon establishing an axle speed threshold determined from a selected ratio of measured locomotive speed. The test then compares estimated wheel speed to the established threshold. As is well known to those skilled in the art the locomotive speed can be measured using various sensors independent of a particular wheel's rotation, such as radar, inertial satellite navigation, or another axle's speed sensor. The axle speed of the locomotive can be determined using well-known principles and known quantities such as the wheel diameter and vehicle speed. The calculated axle speed dictates the threshold for the locomotive controller's estimates of axle speed. Further, as is well known to those skilled in the art the axle speed can also be easily estimated utilizing well known principles of field oriented speed control and information about the motor current, excitation frequency, its installation, and operating conditions. The estimated axle speed is readily compared to the calculated axle speed threshold thereby establishing the fifth test:

$$SPEED_{ESTIMATED} \geq (3/4)\ SPEED_{CALCULATED}.$$

The factor 3/4 is exemplary and it is understood that other factors may be used. When the expression above is true, that is, estimated wheel speed is equal to or less than the calculated wheel speed threshold; the result is logged in a fifth fault counter, incrementing the counter. When the expression above is false, that is estimated wheel speed is in excess of the calculated wheel speed threshold; the fifth fault counter is decremented. Should the counter exceed a predetermined limit value, the fault is logged as a failure of the speed sensor-less traction motor control.

From the tests identified above and taken together, a determination can be made whether the AC motor may be locked and consequently the locomotive axle is potentially locked. FIGS. 5A and 5B depict a flow chart describing a preferred embodiment in accordance with the method of the present invention. The controller 40 executes the tests and functions identified whenever the locomotive is traveling at speed in excess of a minimal limit, typically four miles per hour. As is shown in block 502, the first test is the short circuit model test where the measured current from current transducer 17 is compared to the maximum motor current threshold established from the model. Excessive measured motor current is indicative of the possibility of a locked motor rotor, which would indicate a potentially locked axle condition. If the test yields a result indicating such a fault, the next action is to increment the first fault counter as depicted in block 504. whereby the fault from test 502 increments the counter as in 504 and no fault decrements the counter as in 510. Storage in a counter of test results, such as from the short circuit test of block 502, is typical of methodologies employed by those skilled in the art for evaluating test results. Where commonly the counter is employed in computer implementations to distinguish between sporadic or spurious detections and actual fault conditions. Block 506 depicts the comparison of fault counter to a first limit value, where exceeding the limit value dictates a failure to be reported to the operator as in block 508. A fault count less that the limit value is indicative of a no fault condition and the test sequence is continued at block 512. Returning to block 510, when the short circuit counter is decremented, the system then transitions to the next test in the sequence at block 512.

Continuing now with block 512, the second test is the open circuit model test where the measured current from current transducer 17 is compared to the minimum motor current threshold established from the model. Insufficient measured motor current is indicative of a failed sensor or process. If the test yields a result indicating such a fault, the next action is to increment the second fault counter as depicted in block 514. This block presents the function of storing the result from the open circuit test of block 512 in a counter. Whereby the fault from test 512 increments the counter as in 514 and no fault decrements the counter as in 520. Block 516 depicts the comparison of fault counter to a second limit value, where exceeding the limit value indicates a potential failure to be reported to the operator as in block 518. A fault count less that the limit value is indicative of a no fault condition and the test sequence is continued at block 522. Returning to block 520, when the open circuit counter is decremented, the system then transitions to the next test in the sequence at block 522.

Continuing now with block 522, the third test is the high current test where the measured current from current transducer 17 is compared to the high current threshold established torque and flux relationships. Excessive measured motor current is indicative of the possibility of a locked motor rotor, which would indicate a potentially locked axle condition. If the test yields a result indicating such a fault, the next action is to increment the third fault counter as depicted in block 524. Whereby the fault from test 522 increments the counter as in 524 and no fault decrements the counter as in 530. Block 526 depicts the comparison of fault counter to a third limit value, where exceeding the limit value dictates a failure to be reported to the operator as in block 528. A fault count less that the limit value is indicative of a no fault condition and the test sequence is continued at block 532. Returning to block 530, when the high current counter is decremented, the system then transitions to the next test in the sequence at block 532

Continuing now with block 532, the fourth test is the low current test where the measured current from current transducer 17 is compared to the low current threshold established from torque and flux relationships. Insufficient measured motor current is indicative of a failed sensor or process. If the test yields a result indicating such a fault, the next action is to increment the fourth fault counter as depicted in block 534. This block presents the function of storing the result from the low current test of block 532 in a counter. Whereby the fault from test 532 increments the counter as in 534 and no fault decrements the counter as in 540. Block 536 depicts the comparison of fault counter to a limit value, where exceeding the limit value indicates a potential failure to be reported to the operator as in block 538. A fault count less that the fourth limit value is indicative of a no fault condition and the test sequence is continued at block 542. Returning to block 540, when the low current counter is decremented, the system then transitions to the next test in the sequence at block 542.

Continuing finally with block 542, the fifth test is the wheel speed test where the estimated wheel speed is compared to the speed threshold established from locomotive speed. Insufficient estimated speed is indicative a failed sensor or process. If the test yields a result indicating such a fault, the next action is to increment the fourth fault counter as depicted in block 544. This block presents the function of storing the result from the speed estimate test of block 542 in a counter. Whereby the fault from test 542 increments the counter as in 544 and no fault decrements the counter as in 550. Block 546 depicts the comparison of fault counter to a fifth limit value, where exceeding the limit value indicates a potential failure to be reported to the operator as in block 548. A fault count less that the limit value is indicative of a no fault condition and the test sequence transitions the start block to repeat the sequence of tests. Returning to block 550, when the speed estimate counter is decremented, the system then transitions the start block to repeat the sequence of tests.

If during implementation, the process arrives at any step 508, 518, 528, 538 or 548, this indicates a possible locked axle condition. Further tests may be performed to detect the actual presence of a locked axle. Exemplary tests are described in U.S. Pat. 5,990,648.

From the tests identified above and taken together, a determination can be made whether the AC motor may be locked and consequently the locomotive axle is potentially locked. As stated previously, the status logged in each fault counter is compared to a predetermined limit value for that particular test's fault counter. Should any one of the fault counters exceed the predetermined limit value, a system fault is declared as either a potentially locked axle or a potential sensor fault. The first through fifth limit values may be equal or different and could vary. With a detected fault, speed sensor-less traction motor control should be disabled.

It will be understood by a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method for detecting a potentially locked axle on a vehicle propelled by an AC motor, comprising:
    conducting a speed test by estimating axle speed utilizing at least one of a torque and a current of said AC motor and comparing the estimated axle speed to measured vehicle speed;
    determining the existence of a potential locked axle condition based on the comparing of estimated axle speed to measured vehicle speed; and
    wherein said conducting is executed while said AC motor is providing tractive power.

2. A method as claimed in claim 1 further comprising:
    conducting a short circuit test by determining a maximum motor current threshold based upon a phase to neutral short circuit model for an AC induction motor and comparing the maximum motor current threshold with measured motor current;
    determining the existence of a potential locked axle condition based on the comparing of maximum motor current threshold with measured motor current.

3. A method as claimed in claim 2 wherein the result of said short circuit test is logged in a short circuit fault counter such that measured motor current in excess of the maximum current threshold increments the counter and measured motor current less than the maximum current threshold decrements the counter.

4. A method as claimed in claim 3 wherein the value of said short circuit fault counter is compared to a predetermined limit value.

5. A method as claimed in claim 4 wherein the predetermined limit value of said short circuit fault counter is established to identify a fault condition of a potential locked axle.

6. A method as claimed in claim 1 further comprising:
conducting a high current test by determining an expected high command motor current based upon torque and flux relationships and comparing the expected high command motor current to measured motor current;
determining the existence of a potential locked axle condition based on the comparing of expected high command motor current to measured motor current.

7. A method as claimed in claim 6 wherein the result of the high current test is logged in a high current fault counter such that measured motor current in excess of the expected high current threshold increments the counter and measured motor current less than the high current threshold decrements the counter.

8. A method as claimed in claim 7 wherein the value of said high current fault counter is compared to a predetermined limit value.

9. A method as claimed in claim 8 wherein the predetermined limit value of said high current fault counter is established to identify a fault condition of a potential locked axle.

10. A method as claimed in claim 1 further comprising:
conducting an open circuit test by determining a minimum motor current threshold based upon a phase to nuetral open circuit model for an AC induction motor and comparing the minimum motor current threshold with measurement motor current;
determining the existence of a potienal locked axle condition based on the comparing of minimum motor current threshold with measured motor current.

11. A method as claimed in claim 10 wherein the result of said open circuit test is logged in an open circuit fault counter such that measured motor current less than the minimum current threshold increments the counter and measured motor current in excess of the minimum current threshold decrements the counter.

12. A method as claimed in claimed in claim 11 wherein the value of said open circuit fault counter is compared to a predetermined limit value.

13. A method as claimed in claim 12 wherein the predetermined limit value of said speed fault counter is established to identify a sensor fault condition.

14. A method as claimed in claim 1 further comprising:
conducting a low current test by determining expected low command current based upon torque and flux relationships and comparing the low command current to measured motor current; and
determining the existence of a potential locked axle condition based on the comparing the low command current to measured motor current.

15. A method as claimed in claim 14 wherein the result of the low current test is logged in a low current fault counter such that measured motor current less than the expected low current threshold increments the counter and measured motor current excess of the low current threshold decrements the counter.

16. A method as claimed in claim 15 wherein the value of said low current fault counter is compared to a predetermined limit value.

17. A method as claimed in claim 16 wherein the predetermined limit value of said low current fault counter is established to identify a sensor fault condition.

18. A method as claimed in claim 1 wherein the result of the speed test is logged in a speed fault counter such that estimated axle speed less than the calculated axle speed threshold increments the counter and estimated axle speed in excess of the minimum calculated axle threshold decrements the counter.

19. A method as claimed in claim 18 wherein the value of said speed fault counter is compared to a predetermined limit value.

20. A method as claimed in claim 19 wherein the predetermined limit value of said speed fault counter is established to identify a sensor fault condition.

21. A method as claimed in claim 1 wherein said estimating is executed without an axle speed sensor.

22. A method for detecting a potentially locked axle on a vehicle propelled by an AC motor, comprising:
conducting a speed test by estimating axle speed utilizing at least one of a torque and a current of said AC motor and comparing estimated axle speed to measured vehicle speed;
conducting a short circuit test by determining a maximum motor current threshold based upon a phase to neutral short circuit model for an AC induction motor and comparing the maximum motor current threshold to measured motor current;
conducting a high current test by determining an expected high command motor current based upon torque and flux relationships and comparing the high command motor current to measured motor current;
conducting an open circuit test by determining a minimum motor current threshold based upon a phase to neutral open circuit model for an AC induction motor and comparing the minimum motor current threshold with measured motor current;
conducting a low current test by determining an expected low command current based upon torque and flux relationships and comparing the low command current to measured motor current; and
determining the existence of a potential locked axle condition based on the results of one or more of the speed test, short circuit test, high current test, open circuit test and low current test; and
wherein said conducting is executed while said AC motor is providing tractive power.

23. A method as claimed in claim 22 wherein the result of the speed test is logged in a speed fault counter such that estimated axle speed less than the calculated axle speed threshold increments the counter and estimated axle speed in excess of the minimum calculated axle threshold decrements the counter.

24. A method as claimed in claim 23 wherein the value of said speed fault counter is compared to a predetermined limit value.

25. A method as claimed in claim 24 wherein the predetermined limit value of said speed fault counter is established to identify a sensor fault condition.

26. A method of claim 22 wherein the result of said short circuit test is logged in a short circuit fault counter such that measured motor current in excess of the maximum current threshold increments the counter and measured motor current less than the maximum current threshold decrements the counter.

27. A method as claimed in claim 26 wherein the value of said short circuit fault counter is compared to a predetermined limit value.

28. A method as claimed in claim 27 wherein the predetermined limit value of said short circuit fault counter is established to identify a fault condition of a potential locked axle.

29. A method as claimed in claim 22 wherein the result of the high current test is logged in a high current fault counter such that measured motor current in excess of the expected high current threshold increments the counter and measured motor current less than the high current threshold decrements the counter.

30. A method as claimed in claim 29 wherein the value of said high current fault counter is compared to a predetermined limit value.

31. A method as claimed in claim 30 wherein the predetermined limit value of said high current fault counter is established to identify a fault condition of a potential locked axle.

32. A method as claimed in claim 22 wherein the result of said open circuit test is logged in an open circuit fault counter such that measured motor current less than the minimum current threshold increments the counter and measured motor current in excess of the minimum current threshold decrements the counter.

33. A method as claimed in claim 32 wherein the value of said open circuit fault counter is compared to a predetermined limit value.

34. A method as claimed in claim 33 wherein the predetermined limit value of said open circuit fault counter is established to identify a sensor fault.

35. A method as claimed in claim 22 wherein the result of the low current test is logged in a low current fault counter such that measured motor current less than the expected low current threshold increments the counter and measured motor current in excess of the low current threshold decrements the counter.

36. A method as claimed in claim 35 wherein the value of said low current fault counter is compared to a predetermined limit value.

37. A method as claimed in claim 36 wherein the predetermined limit value of said low current fault counter is established to identify a sensor fault condition.

* * * * *